Aug. 14, 1923.
R. FÖRSTER
1,465,214
APPARATUS FOR THE FINELY GRADUATED REGULATION OF A CURRENT STRENGTH
Filed Sept. 7, 1920
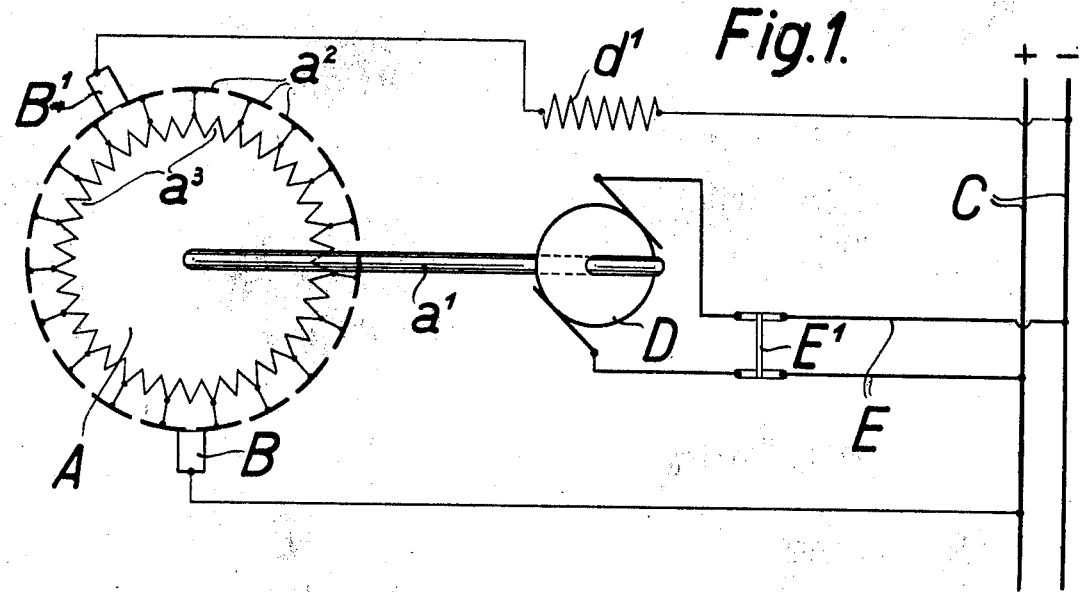
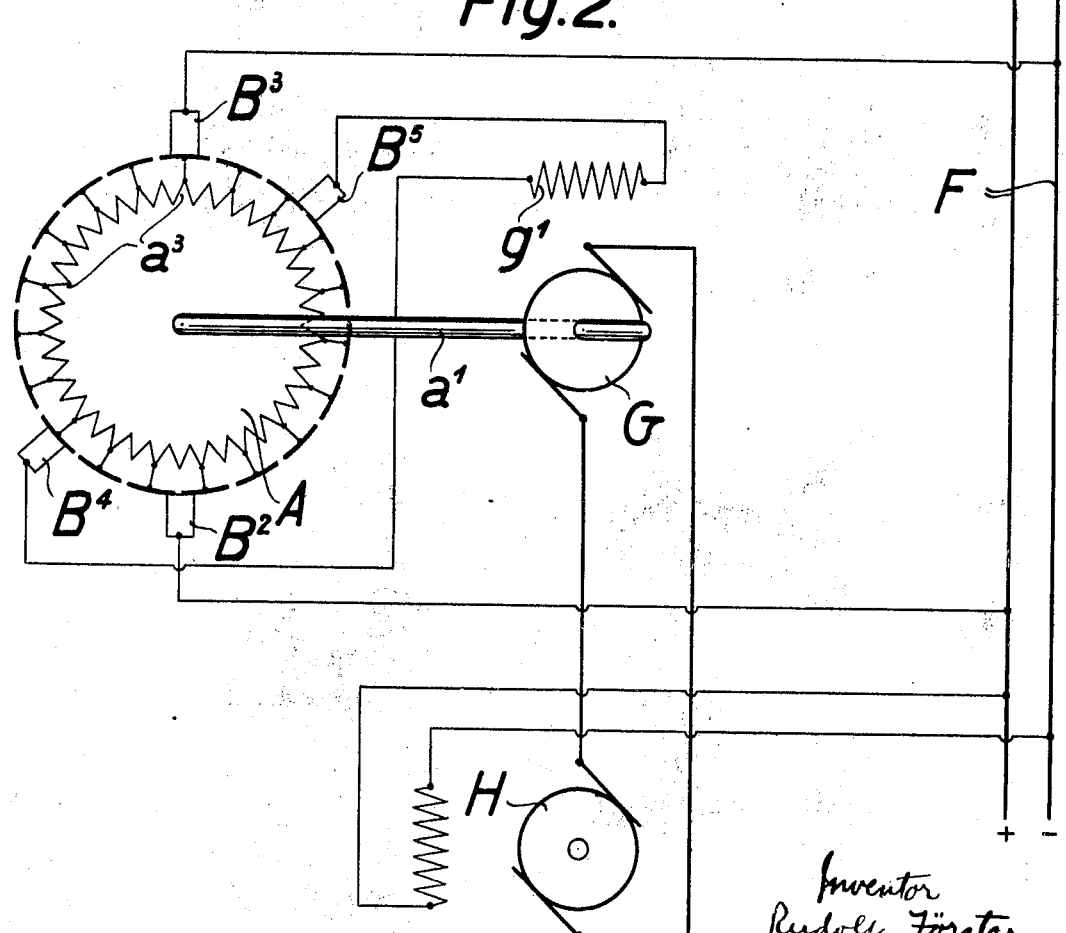
Inventor
Rudolf Förster
By Knight Bros
Attys Patented Aug. 14, 1923.

1,465,214

UNITED STATES PATENT OFFICE.

RUDOLF FÖRSTER, OF ESSEN, GERMANY, ASSIGNOR TO FRIED. KRUPP AKTIENGESELL-SCHAFT, OF ESSEN-ON-THE-RUHR, GERMANY.

APPARATUS FOR THE FINELY-GRADUATED REGULATION OF A CURRENT STRENGTH.

Application filed September 7, 1920. Serial No. 408,742.

*To all whom it may concern:*

Be it known that I, Dr. RUDOLF FÖRSTER, residing at Essen, Germany, a citizen of the German Republic, have invented a certain new and useful Improvement in Apparatus for the Finely-Graduated Regulation of a Current Strength (for which I have filed applications in Germany Aug. 27, 1917; Austria, Sept. 16, 1918; Hungary, Oct. 19, 1918; Switzerland, May 12, 1920, and Holland, May 3, 1920), of which the following is a specification.

This invention relates to apparatus for the finely graduated regulation of a current strength with a closed series of resistances, each of which is connected to two plates of a device constructed like a collector. The object of the invention is to provide an apparatus of this kind for current strengths of any desired magnitude, which apparatus permits of a specially finely graduated and therefore almost constant regulation and is distinguished by great simplicity and particularly good working conditions.

The invention will be described with reference to the accompanying drawings which show two constructions of the invention.

Figure 1 is the first construction of the apparatus in conjunction with a continuous current shunt wound motor, the strength of the exciting current of which is to be regulated, and Figure 2 is a second construction in conjunction with the current generator of a Leonard system of connections, the strength of the exciting current of which is to be regulated between a positive and a negative maximum value.

The first construction will be described first.

Referring to Figure 1 on a cylindrical device A, which is constructed like a collector and keyed upon a shaft $a^1$, are mounted a number of plates $a^2$ composed of conducting material and separated from each other by small gaps containing non-conducting material. On the cylindrical device A is also mounted a closed series of resistances $a^3$ connected up in series and the number of which is equal to that of the plates $a^2$. The several resistances are connected by their ends to alternate adjacent plates.

Over the external surface of the plates $a^2$ travel two brushes B and $B^1$, which are staggered relatively to each other in the direction of the axis of the cylindrical device A and of which brushes one, B, is fixed and the other $B^1$ adjustable in the direction of the periphery of the device A. The fixed brush B is connected up to the positive pole of a source of continuous current C of constant tension, while the adjustable brush $B^1$ is connected up to the negative pole of the source of current. In the conductor, which connects the adjustable brush $B^1$ to the negative pole of the source of current C is located the exciting winding $d^1$, of a continuous current shunt wound motor D $d^1$, the armature D of which is keyed on the shaft $a^1$. The armature D is in electrical connection with the source of current C through a conductor E, which can be interrupted by a two pole switch $E^1$.

The resistances between the brushes B $B^1$ form two parallel connected groups of series connected resistances, the combined resistance of which is at its maximum value, when the adjustable brush $B^1$ is diametrically opposite the fixed brush B, and is equal to zero when the brushes B and $B^1$ touch the same plate. When the device A is stationary, the magnitude of the combined resistance is dependent only on the angle, which the brushes B and $B^1$ enclose between them, and is accordingly constant for a certain angular position of the brushes.

When, however, the device A rotates, the magnitude of the combined resistance is also dependent on the angular position of the plates $a^2$ at any moment with respect to the brushes B and $B^1$. This angular position of the plates $a^2$ with respect to the brushes B and $B^1$ is subjected to periodical variations, when the device A rotates. When the device A rotates, the following four operations are repeated namely:

1. The short circuiting of a resistance $a^3$ by the one brush (B).
2. The removal of the short circuit at this brush.
3. The short circuiting of a resistance by the other brush ($B^1$) and
4. The removal of the short circuit at this brush.

In consequence of the short circuiting and switching into circuit again, which is continually repeated in the manner described, the magnitude of the effective combined resistance between the brushes B and $B^1$ allows permanently of a periodical variation, when the device A rotates. This variation of the combined resistance takes place so rapidly, when the device A rotates quickly, that the mean value of the periodic variations of the combined resistance is the governing factor for the strength of current existing in the circuit C B $a^3$ $B^1$ $d^1$ C. This means value is invariable as long as the angular position of the adjustable brush $B^1$ does not vary with respect to the fixed brush B.

If now the adjustable brush $B^1$ be moved through a small angle in respect to its former angular position, there will result (as can be proved by experiments and calculations) a new mean value of the combined resistance, which differs from the previous one by a small amount only and consequently the current strength corresponding to the new mean value and existing in the circuit C B $a^3$ $B^1$ C will differ by a small amount only from the previous strength. By adjusting the brush $B^1$, an almost constant regulation of the current strength of the circuit C B $a^3$ $B^1$ $d^1$ C will therefore be obtained when the device A rotates.

The above described apparatus is used as follows: The brush $B^1$ is first moved so far, the switch being open, that it stands with the brush B on the same radius of the device A. Since in this position the effective resistance between the two brushes B and $B^1$ is equal to zero, the maximum value of the current strength flows through the circuit C B $B^1$ $d^1$ C which current strength results from the tension of the source of current C and the resistance of the winding $d^1$.

The switch $E^1$ is then closed, so that the armature D of the motor starts and sets the device A in motion. Since the two brushes B and $B^1$ stand on the same radius, the effective resistance between the two brushes retains its zero value even during the rotation of the device A and the current strength of the circuit C B $B^1$ $d^1$ C therefore at first remains unchanged. If now the brush $B^1$ be moved on the periphery of the device A out of its original position, the mean value of the effective combined resistance between the two brushes will according to the foregoing be almost constantly increased. The said effective combined resistance attains its maximum value, when the movable brush $B^1$ and the fixed brush B are situated diametrically opposite each other. Corresponding to the almost continuous increase in the given mean value, the strength of the current flowing in the circuit C B $a^3$ $B^1$ $d^1$ C will be almost continuously decreased on this movement of the brush $B^1$. The current strength can be read off as an absolutely constant value on a current indicator for example (not shown) placed in the circuit C B $a^3$ $B^1$ $d^1$ C, since the fluctuations between the periodically occurring momentary values of the strength of the current take place so rapidly that the current indicator instantly sets itself to a temporary mean value similar to a current indicator placed in an alternating circuit.

The apparatus above described possesses over the usual apparatus for continuously regulating the strength of a current, which is provided with a bright resistance wire and a contact sliding along it, the advantage that it is suitable not only like those for small current strengths but in addition for all strengths of current occurring in regular working. As in the first construction above described the resistances $a^3$ take part in the rotary movement of the device A, they are subjected to particularly favourable cooling conditions and may be made to carry a considerably higher current density than stationary resistances are capable of doing. Compared with the ordinary variable resistances, apart from the possibility of obtaining a much more finely graduated regulation for the same number of resistances, the apparatus described possesses the important advantage, that all the several resistances are always subjected to an equally intense heating. Owing to the continued rotation, each separate resistance passes in periodical recurrence into the place of every other separate resistance whereas this is not the case with the ordinary variable resistances. In these latter therefore the current load and consequently the heating up of the several resistances assume entirely different values according to the position of the movable contacts. The average amount of heat to be borne by the several resistances is therefore, owing to this cause alone, considerably less than it is in the case of variable resistances of the ordinary type. In addition to this there is also the already mentioned favourable influence of the more intense cooling owing to the circular movement of the resistances.

The second construction shown in Figure 2 differs from the one just described firstly by the fact, that the device A is rigidly connected by the shaft $a^1$ not to the armature of a motor but to the armature G of a continuous current generator G $g^1$ connected up by a Leonard connection with the armature H of a motor. A further difference consists in the fact that instead of the rubbing brushes B and $B^1$ two pairs of brushes $B^2$, $B^3$ and $B^4$, $B^5$ are provided, the brushes of which are situated respectively diametrically opposite each other on each diameter and of which the first mentioned pair of brushes $B^2$ $B^3$ is stationary and the last mentioned pair $B^4$, $B^5$ is adapted to be rotated about the axis of the device A. The stationary pair of brushes $B^2$, $B^3$ is connected up directly to a source of continuous current F of constant tension and the rotary pair of brushes is connected up to the end of the exciting winding $g^1$ of the continuous current generator G $g^1$.

The system of connections of the source of current F of the exciting winding $g^1$ and the groups of separate resistances $a^3$ situated between the brushes $B^2 B^3 B^4 B^5$ forms a bridge connection of the Wheatstone type in which the galvanometer placed in the shunt of the bridge is replaced by the exciting winding $g^1$. The exciting winding $g^1$ is therefore devoid of current, when the bridge is compensated, that is to say, when the movable pair of brushes $B^4 B^5$ is at right angles to the pair of brushes $B^2 B^3$. When the movable pair of brushes $B^4 B^5$ is moved out of this position in one direction of rotation, a current begins to flow in the winding $g^1$ in one direction and when the said pair of brushes is moved in the opposite direction of rotation, a current begins to flow in the other direction. The finely graduated regulation of this current takes place in all other respects, as soon as the device A rotates, by the gradual shifting of the pair of brushes $B^4 B^5$ in exactly the same manner as in the arrangement shown in Figure 1. The one (the positive) maximum value of the current strength in the exciting winding $g^1$ is attained, when, for example the brush $B^4$ is covered by the brush $B^2$ and the brush $B^5$ by the brush $B^3$. Conversely when the brushes $B^5$ and $B^2$ and the brushes $B^4$ and $B^5$ cover each other, the other (the negative) maximum value of the current strength arises. In other respects the regulation of the strength of the current takes place in this construction owing to the causes given in the first construction and in a very finely graduated, that is to say, almost continuous manner. At the same time this apparatus possesses all the advantages set forth in the description of the first construction.

Claims:

1. A resistance comprising a revolubly mounted segmented drum, resistance elements continuously connected between adjacent segments and brush lead devices contacting with the segments of said drum, one of said brush lead devices being adjustable with respect to the other, and means for rotating said drum.

2. In combination with a current consuming element, series resistance means for finely regulating the current through said element, comprising a segmented drum, resistance elements continuously connected between all the adjacent segments of said drum and adjustable brushes on said drum for variably spanning a series of resistance elements, and means for rotating said drum.

3. A Wheatstone bridge for finely divided adjustment of a current strength between a positive and a negative limit, comprising a current consuming element, a segmented drum, resistance elements continuously connected between adjacent segments and four brush arms engaging with the segmented surface of said drum, a source of power for two of said brush arms, the remaining two brush arms being connected to each other through said current consuming element and adjustable with respect to the first named two brush arms, and means for rotating said drum.

The foregoing specification signed at Essen, Germany, this 27th day of May, 1920.

DR. R. FÖRSTER.

In the presence of—
HANS GOTTSMANN,
JOSEF OWERTZ.